United States Patent [19]
Jiang

[11] Patent Number: 6,167,432
[45] Date of Patent: *Dec. 26, 2000

[54] METHOD FOR CREATING PEER-TO-PEER CONNECTIONS OVER AN INTERCONNECTED NETWORK TO FACILITATE CONFERENCING AMONG USERS

[75] Inventor: Barclay Ruiqing Jiang, Sunnyvale, Calif.

[73] Assignee: WebEx Communications, Inc.,, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/609,025

[22] Filed: Feb. 29, 1996

[51] Int. Cl.[7] .................................................. G06F 15/16

[52] U.S. Cl. ............................ 709/204; 709/203; 709/245

[58] Field of Search ........................... 395/200.1, 200.09, 395/200.02, 200.73, 200.33, 200.46, 200.31, 200.34, 200.47, 200.57, 200.75; 709/204, 203, 243, 217, 227, 245

[56] References Cited

U.S. PATENT DOCUMENTS

| | | | |
|---|---|---|---|
| 5,475,819 | 12/1995 | Miller et al. | 395/200.03 |
| 5,499,343 | 3/1996 | Pettus | 395/200.2 |
| 5,546,854 | 8/1996 | Lundin et al. | 395/700 |
| 5,561,769 | 10/1996 | Kumar et al. | 395/200.05 |
| 5,572,643 | 11/1996 | Judson | 395/793 |
| 5,581,702 | 12/1996 | McArdle et al. | 709/204 |
| 5,689,641 | 11/1997 | Ludwig et al. | 709/204 |
| 5,717,863 | 2/1998 | Adamson et al. | 395/200.34 |
| 5,721,911 | 2/1998 | Ha et al. | 395/611 |
| 5,729,682 | 3/1998 | Marquis et al. | 395/200.12 |
| 5,754,775 | 5/1998 | Adamson et al. | 709/204 |

OTHER PUBLICATIONS

Diamond: A multimedia message system built on a distributed architecture by Thomas et al., Dec. 1985, IEEE publication, pp. 65–78.

A decentralized software bus based on IP multicasting by, 1994 IEEE publication, pp. 65–69.

A practical method for achieving portable communications in the Internet context by Qu et al, IEEE publication pp. 1512–1516, 1995.

A world–wide distributed system using Java and the Internet, by Chandy et al. IEEE p. 11–18, 1996.

"Real–time internet conferencing takes off" by Frentzen Feb. 20, 1995 v12 n7 p. 18 (1).

"Online services forsake people for publishing" by Gross Mar. 6, 1995 v4 n10 p. 24 (2).

Using Netscape 2 by Brown, 1995, pp. 777–800.

*Primary Examiner*—Zarni Maung
*Attorney, Agent, or Firm*—Oppenheimer Wolff & Donnelly LLP; Claude A. S. Hamrick; Emil C. Chang

[57] ABSTRACT

A method for facilitating the creation and maintenance of network connections over an interconnected network for the purpose of facilitating the creation and participation of on-line conferences in accordance to the peer-to-peer paradigm is disclosed. A designated location on the network (e.g. a web site) on an interconnected network such as the internet is setup in such a manner that a conference may be created and conference participants can be easily connected into the created conference by making a few simple selections. The IP addresses of the conference participants are maintained at the designated site and are transmitted to a new conference participant to allow the new conference participant to connect directly into the conference without the new participant having to know the IP addresses of the conference participants. The new participant may be connected to any one of the existing conference participants. Once the conference is established, no data goes through the designated site or a central host. Data packets are directly sent to and received by the respective application program of each participant.

17 Claims, 7 Drawing Sheets

CONFERENCE REGISTRATION

| | |
|---|---|
| Conference : | ABC Project Conference |
| Subject: | Project Progress Report |
| Chairperson: | John |
| Participants: | John, Mike, Susan |
| Your Name: | ☐ |
| Password:<br>(for private conference) | ☐ |

[Click] Join Conference

METHOD FOR CREATING PEER-TO-PEER CONNECTIONS OVER AN INTERCONNECTED NETWORK TO FACILITATE CONFERENCING AMONG USERS

BACKGROUND OF THE INVENTION

1. Field of the Invention

The present invention generally relates to methods for establishing network connections for conferencing over computer networks, and more particularly, a method for establishing conferences and linking conference participants to the conferences over the internet.

2. Description of the Prior Art

In hosting a conference over a computer network such as the internet, the conference host advertises and promotes the conference as to the subject matter of the conference and the time and location of the conference. Parties interested in participating in the conference join the conference via their network connections at the designated time.

Figure 1:
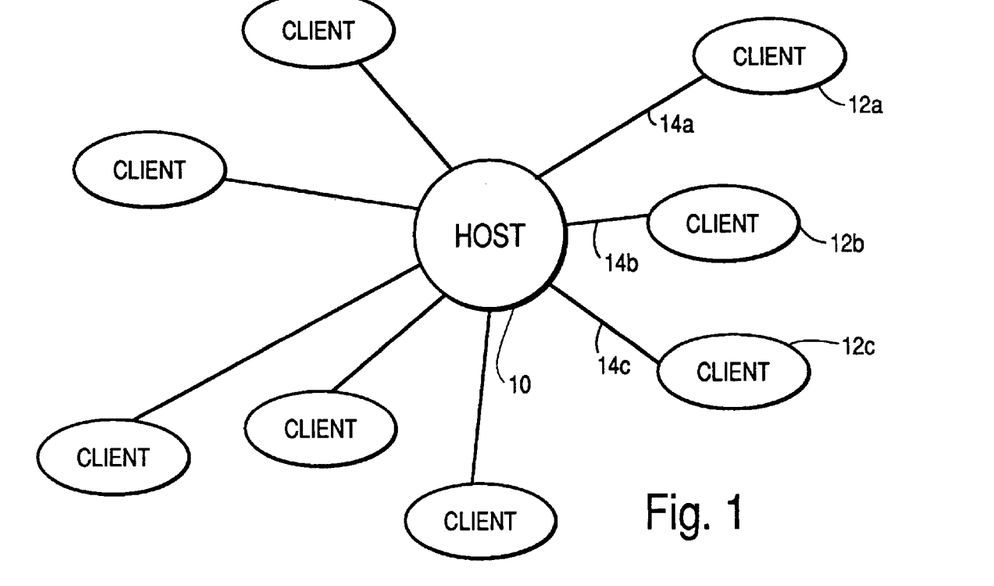
FIG. 1 illustrates connections in accordance to the client/server paradigm where users are connected to a central server for the purpose of conferencing.

The traditional paradigm of an on-line conference, referring to FIG. 1, consists of a host server 10 connecting a number of conference participants or clients 12a–12c through their respective individual channels 14a–14c. This is a client/server paradigm where a host server connects a number of clients. Under this paradigm, a great deal of computing resources are consumed by the host server.

Figure 2:
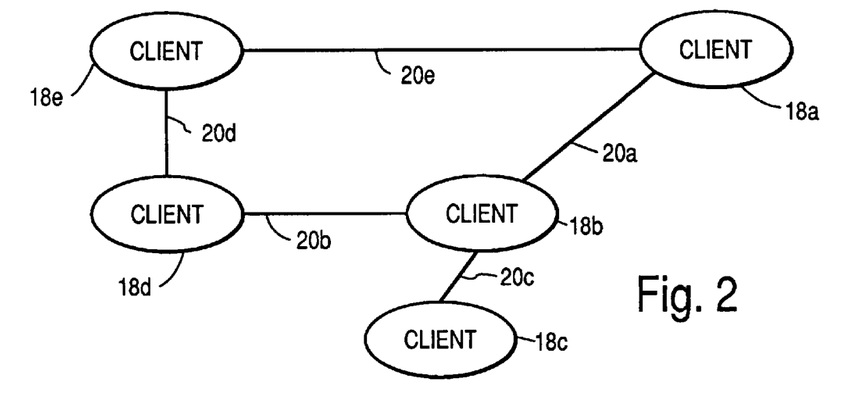
FIG. 2 illustrates connections in accordance to the peer-to-peer paradigm where users are connected to each other without a central host.

The traditional paradigm is no longer adequate in meeting the dynamic and flexible environment demanded by the activity of the network users of today and of the future. Ideally, given the level of activity on the internet, a different paradigm, referring to FIG. 2, is desirable. In this peer-to-peer paradigm, there is no host server, and a number of clients 18a–18e are connected via a number of channels 20a–20e in a variety of manners. The advantage with this paradigm is that there is not a central host server to connect the clients. As long as the clients utilize application programs allowing communication across networks between the clients, this network paradigm is feasible and desirable.

However, there are several problems in establishing network connections over an interconnected network in accordance with the peer-to-peer paradigm. These problems prove to be cumbersome and sometimes are administratively impossible for the clients (or conference participants) to overcome. The problem lies in finding the internet protocol ("IP") address of the client hosting the conference (conference chairperson) or the IP address of any one of the clients in the conference (conference participants).

An IP address uniquely identifies a user's internet presence and is composed of four bytes of information representing a domain name and an identification number in that domain. By knowing the IP address of a user, an internet connection can be established with that user.

However, the IP address of a particular user is not always the same. If a user dials into an internet service provider ("ISP") in establishing an internet connection, the users may be assigned a different IP address every time due to the fact that the ISP has a limited number of connections to the internet and IP addresses must be dynamically allocated as requested. For users having direct connections to the internet through their company or organization, their IP addresses may be remapped, may change over time, or may be machine dependent. Furthermore, many companies and organizations have a computer network security barrier commonly referred to as a "firewall" to stop unauthorized intrusion into their computer networks, and the firewall may translate an IP address for a particular computer or user such that the computer or user is identified by a different address every time.

The problems with IP addresses minimize conferences from being established in accordance with the peer-to-peer paradigm on the internet, minimizing activities such as document conferencing, video conferencing, etc.

SUMMARY OF THE INVENTION

It is therefore an object of the present invention to provide a method for dynamically establishing a conference over the internet in accordance with the peer-to-peer paradigm.

It is another object of the present invention to provide a method for maintaining the IP addresses of the conference participants of a conference for the purpose of allowing a new user to join a conference without having to know the IP addresses of the conference participants.

Briefly, a method for facilitating the creation and maintenance of network connections over an interconnected network for the purpose of facilitating the creation and participation of on-line conferences in accordance to the peer-to-peer paradigm is disclosed. A designated location on the network (e.g. a web site) on an interconnected network such as the internet is setup in such a manner that a conference may be created and conference participants can be easily connected into the created conference by making a few simple selections. The IP addresses of the conference participants are maintained at the designated site and are transmitted to a new conference participant to allow the new conference participant to connect directly into the conference without the new participant having to know the IP addresses of the conference participants. The new participant may be connected to any one of the existing conference participants. Once the conference is established, no data goes through the designated site or a central host. Data packets are directly sent to and received by the respective application program of each participant.

An advantage of the present invention is that a conference participant may join a conference without having to know the IP addresses of other conference participants.

Another advantage of the present invention is that the established conference has no data going through a central host or a designated site.

These and other objects and advantage of the present invention will no doubt become obvious to those of ordinary skill in the art after having read the following detailed description of the preferred embodiments.

IN THE DRAWINGS

FIG. 9b is a table of keys to FIG. 9a.

DETAILED DESCRIPTION OF THE PREFERRED EMBODIMENTS

The preferred embodiment of the present invention provides a virtual conference hall on the World-Wide Web ("WWW") as a clearinghouse for all the conferences. A user, by using a web-browser and a helper-application program, may go to the virtual conference hall, announce and advertise a conference, create a conference, or join an on-going conference.

The host machine supporting the virtual conference hall does not actually host any conferences by receiving and redistributing data packets. Rather, the virtual conference hall facilitates the establishment of conference connections for users wishing to participate in a conference. Once a conference is established, data transmission from one user to another user is routed directly via the appropriate internet protocol and transmission paths. For example, a user, by indicating the conference of his or her choice, is connected to the conference whereby an internet connection is automatically established between this user and one of the existing conference participants without the user having to know the IP address of a conference participant.

Figure 3:
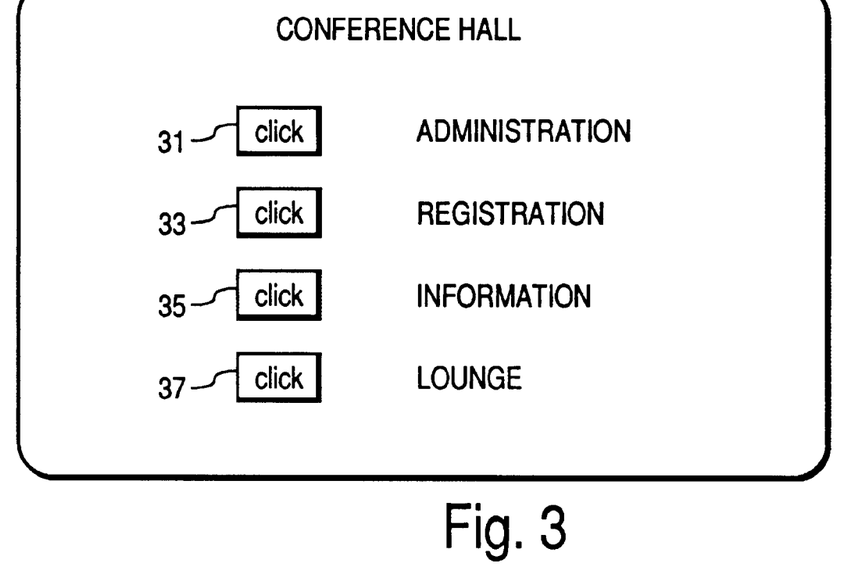
FIGS. 3–7 show web page layouts and hypertext selections in the preferred embodiment of the present invention.
Figure 4:
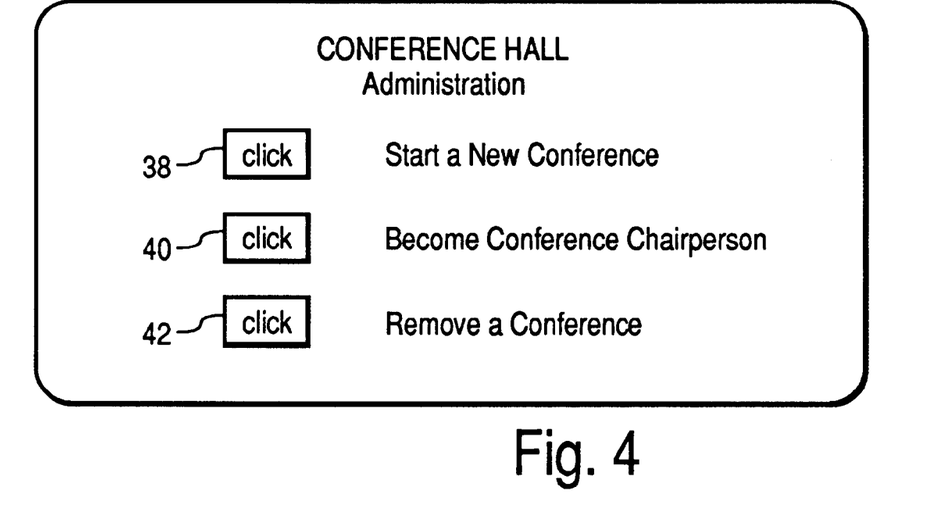
Figure 5:
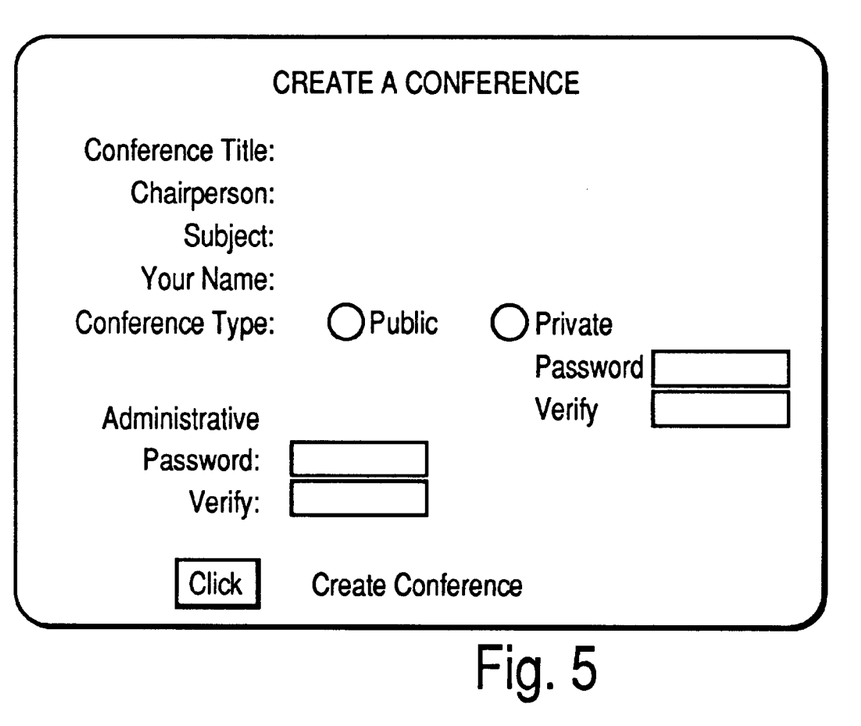

Illustrating an example of the process of using an implementation of the present invention, a user by using a web browser goes to a designated site on the internet such as "http:\\www.conferencehall.com." At this site, referring to FIG. 3, several selections are available to the user, administration 31, registration 33, general information 35, and lounge 37. Referring to FIG. 4, the administration selection provides the user with the option to create a conference 38, remove a conference 42, or have the user be the designated chairperson of a particular conference 40. If the user chooses to create a conference, referring to FIG. 5, the user is then provided with a form asking for information pertinent to the conference, information such as the conference title, host of the conference, subject of the conference, the user's name, the conference type, and an administrative password. When a conference is created, a conference record for this particular conference is created and inserted into a conference list containing the records for all the conferences. This list is automatically updated to reflect the conference as an on-going conference where people may freely participate in it if it is a public conference. Referring back to FIG. 4, under the administration page, a user may select to remove a conference (42) after the conference is over, provided that the user has the administrative password for the conference. An automatic conference removal method can also be implemented, as opposed to the manual removal process. As a third selection under the administration page, the user may select to change the chairperson of a conference (40), and the conference list will be updated to reflect such a change.

Figure 6:
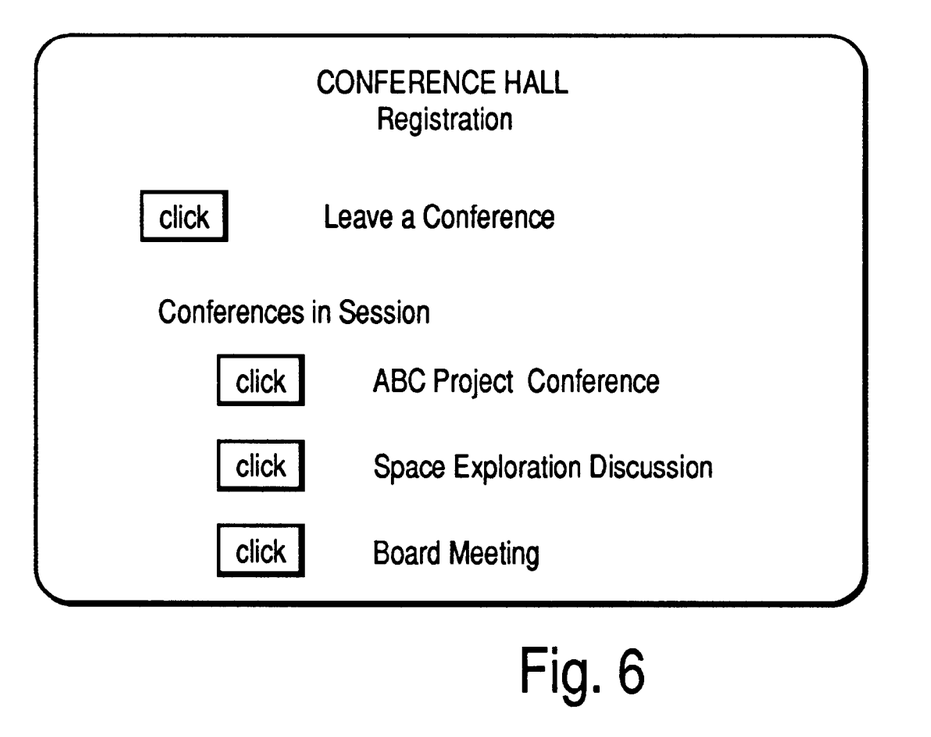
Figure 7:
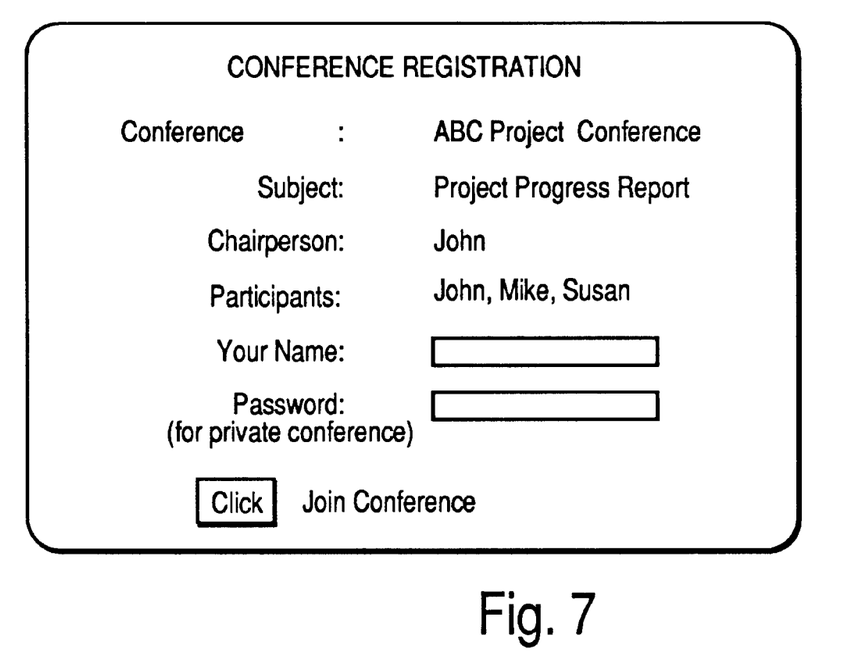

A user interested in becoming a conference participant, referring to FIG. 6, may register for a conference by selecting an ongoing conference from a list of on-going conferences. Referring to FIG. 7, if a conference is a public conference, the user joins the conference, and the user's name, IP address, and other pertinent information is added to the conference record. Information regarding this conference is refreshed accordingly 58. In joining a conference, a helper application (or plug-in software) predefined in the pertinent section of the web browser is automatically launched and the user is connected to the selected conference through the helper application where the IP address of the conference chair or the conference participant (s) is automatically provided to the helper application to establish the internet connection. Through the helper-application, the user becomes a conference participant and can begin discussions with other conference participants.

If the selected conference is a private conference, a password is requested before the user is allowed to join a conference. After finishing with a conference, a conference participant may remove his or her name from the conference list. The process for removing a conference participant from a conference list may be automated by periodically polling the status of the IP connection with the net browser or helper-application of the respective conference participants.

Figure 8:
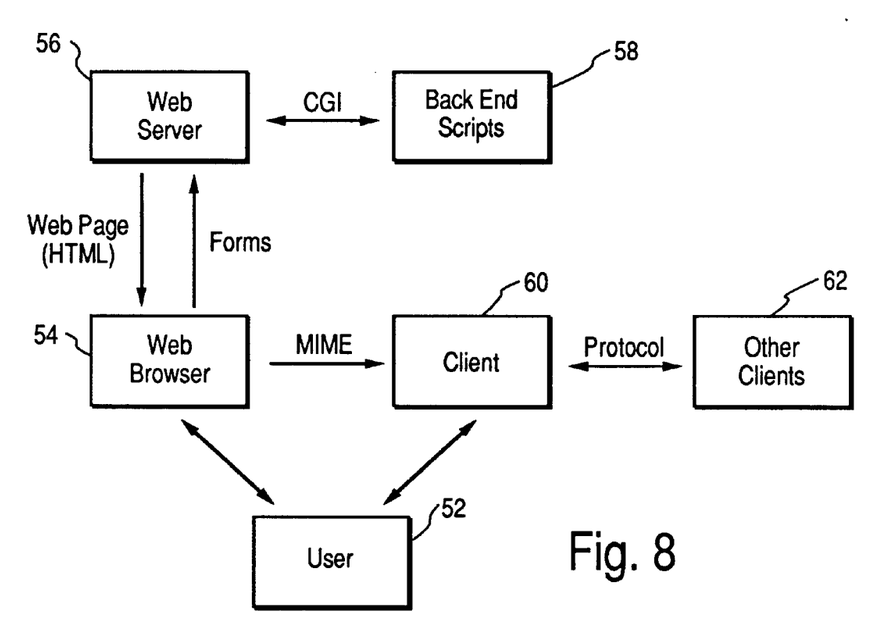
FIG. 8 shows the basic architecture for web interface.

Having now described the process via one implementation of the present invention, the underlying techniques are now described. FIG. 8 illustrates the basic architecture for the World Wide Web interface for the preferred embodiment. The user 52 activates a web browser (also called net browser) 54 and connects to the internet via the web browser. By visiting a site (web server 56) such as the virtual conference hall in our example "http:\\www.conferencehall.com", a file in the hypertext mark-up language (HTML) format is sent to the user and displayed by the web browser on the user's computer (remote computer). In certain cases, a form requesting information from the user is sent to the user in HTML format. By completing the form and sending it back to the web server (the host computer), a designated common gateway interface (CGI) script 58 (which is a series of commands in the PERL programming language) may be programmed to be executed by the web server. The commands in the script file may request the web server 56 to send a formatted Multi-Purpose Mail Extension (MIME) type stream to the user's web browser which may activate a particular helper application 60 to connect the user's helper-application to other conference participant's helper-applications 62.

Figure 9A:
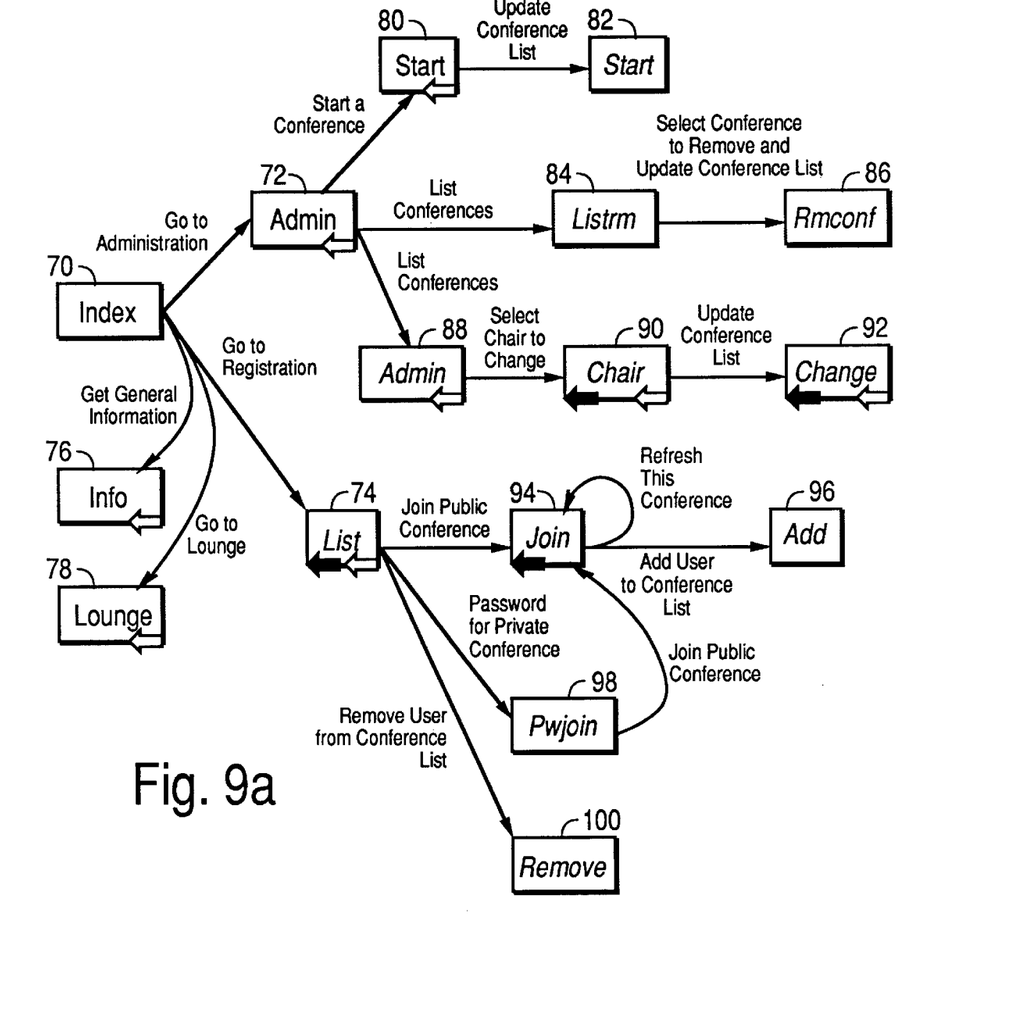
FIG. 9a is an overall design of the menu and command structure of the preferred embodiment.
Figure 9B:
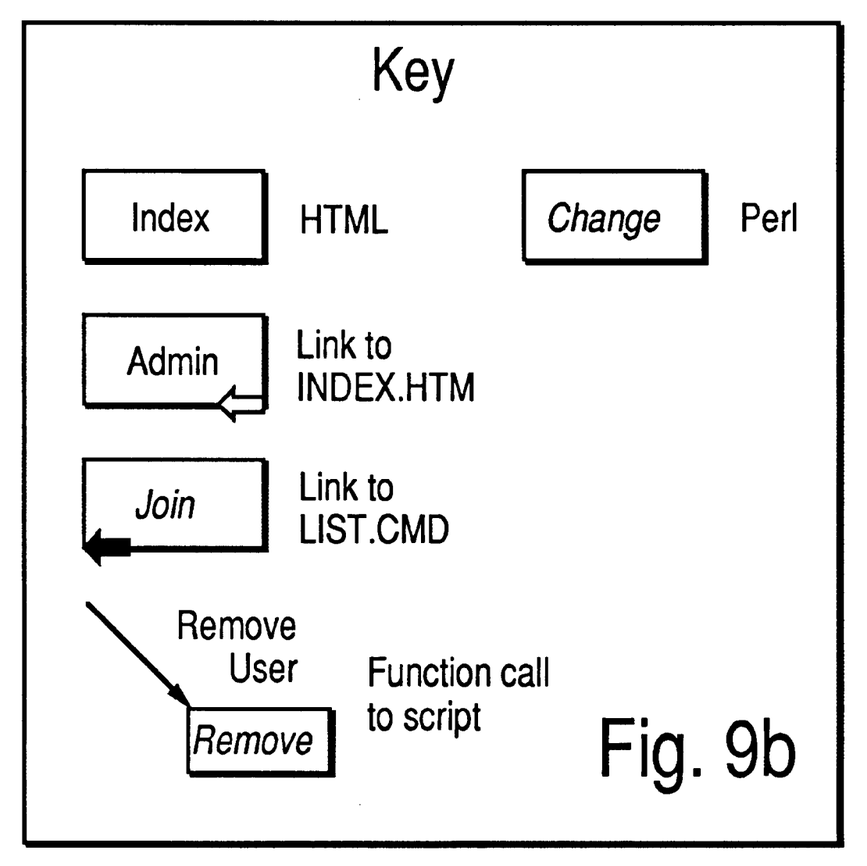

FIG. 9a illustrates an overall menu and command structure (corresponding to FIGS. 3–7) of an implementation of the preferred embodiment of the present invention and FIG. 9b provides a table of keys to the box symbols used in FIG. 9a. The menu and command structure are briefly described and the major functions such as the create-a-conference function and the join-a-conference function are described in detail in the following sections. When visiting the virtual conference hall on the internet, the web server sends to the user the index.html file 70 which provides several hypertext selections. By clicking on a selection, the corresponding CGI script file may be executed and the corresponding HTML file is sent to the user 72–78.

From the administration HTML page 72, the user may select the start-a-conference selection 80 whereby the corresponding CGI script file is executed, a new conference record is created, and the conference list is updated. The user also may select to remove a conference. In this operation, the list of on-going conferences are displayed (84) to the user, the user selects a conference to remove, and, given the right password, the underlying remove-conference CGI script is executed (56) to remove the corresponding conference record. As a third selection under the administration page, the user may change the chairperson of a conference by displaying the list of on-going conferences (88), and select and change the conference chair (90) of a particular conference. The corresponding CGI script updates the conference list.

Under the registration page 74, a user may join a public conference 94 whereby the user is asked to fill out a form and the user is added to the conference list 96. For a private conference, a password is requested from the user (98) before the user is allowed to join the conference (94). After finishing with a conference, the user may remove his or her name from the conference record 100.

The information page 76 may provide a variety of information regarding the conferences or any other type of information. The lounge page 78 may provide links to other sites for browsing while a user waits for other users.

Creating a Conference In selecting the link to create a conference, a form is sent by the host server of the virtual conference hall to the user's web browser. The form provides blank spaces requesting conference information from the user, information such as the conference title, company name, subject of the conference, the user's name, an administrative password, and a password if it is a private conference. Once the form is filled out, the user clicks on a button on the screen which causes the form to be sent back to the host server. In receiving the form, the host server activates a conference creation CGI script that parses and extracts information from the form, and stores the extracted information as a new conference record into a conference list or database containing records of all the on-going conferences. Furthermore, the user's IP address is obtained from the CGI environment variable REMOTE_ADDR and stored in the conference record. Then, a MIME type stream containing information regarding the helper application that is to be launched by the user's browser and other pertinent information is sent back to the user's browser. The user's browser upon receiving the MIME stream launches the designated helper application, and the helper application is instructed to go into the listening mode to wait for incoming connection requests. The helper application in this case can be any conferencing software. In the preferred embodiment, the document conferencing software TalkShow is used. With the helper application in listening mode, one or more subsequent connections will establish a conference where users are connected and may chat or pull up documents or graphs for discussion and annotation via their helper applications.

Joining a Conference

For a user to participate in a conference, the user clicks on the Conference Registration icon which will cause the conference list to be displayed to the user. By clicking on the conference of his or her choice, a form is sent to user requesting the user's name and a password if it is a private conference. When the user sends the form back to the host server, a join-conference CGI script is executed where the information provided by the user is extracted and stored in the corresponding conference record in the conference list. This user's IP address is stored as well for later use. Then, a MIME stream containing the IP address of the conference chair along with other pertinent information is sent back to the user. Upon receiving this MIME stream, the user's web browser activates the same or a compatible helper-application, and the IP address of the conference chair is provided to the helper-application. The helper-application makes a TCP/IP call to the conference chair using the given IP address. Upon receiving the call, the chairperson's helper-application connects to the caller and a conference session is thereby established.

Once the conference session is established, there is no traffic (data packets) going through the conference hall server machine (the host computer). The conference participants communicate directly to each other via their helper-applications.

In the case where the connection for the conference chair is dropped and its IP address is no longer active, another conference participant may become the conference chair by going back to the virtual conference hall and updating the conference list via the "change chairperson" selection. This conference participant then becomes the chairperson and its IP address is stored accordingly.

In an alternate embodiment, if the conference chairperson's connection is dropped and a new conference chair is not designated, a new conference participant may join the conference by using the IP address of any one of the current conference participants. This embodiment can be implemented by sending the IP addresses of all the current conference participants in the MIME stream to the user's browser and have the helper application be directed to try all the addresses until an active address is found.

Removing a Conference Participant

A conference participant may leave the conference and manually sign off the conference via a provided selection on the registration page of the virtual conference hall so that the user's name will not be shown as a conference participant. The user's name will be deleted from the conference record by a CGI script. This process can also be automated where the server of the virtual conference hall periodically samples the connections to determine existing conference participants and updates the conference record accordingly.

Note that in the case where a network has a firewall and there is a SOCKS proxy running between the browser and the web server, the CGI script gets the IP address of the SOCKS proxy rather than the IP address of the client machine that is running the browser. This problem is solved by providing a name registration daemon that registers each participant's IP address and port number. When the helper-application is launched by the browser, the helper-application first makes a TCP/IP connection to the daemon so that the daemon registers the helper-applicant's client's IP address.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What I claim is:

1. A method for establishing peer-to-peer network connection over an interconnected network of computers for conferencing between two or more users, comprising the steps of:

a) providing a web site accessible via the interconnected network of computers;

b) receiving at said web site connection information associated with two or more users each using an associated remote computer having an associated unique network address, said connection information including the network addresses of said remote computers;

c) storing said connection information associated with said users at said web site; and d) sending the connection information associated with each said user to the remote computers of the other ones of said users in order to facilitate establishing direct network connections for conferencing between said users.

2. A method as recited in claim 1 wherein said direct network connection for a particular user is terminated by the steps of:

sending by the remote computer of said particular user a request for termination of said direct network connection of said particular user;

receiving said request; and deleting the connection information associated with said particular user from said web site.

3. A method as recited in claim 1 wherein said web site provides a web page listing one or more conferences.

4. A method as recited in claim 3 wherein each of said users selects a conference from said web page.

5. A method as recited in claim 4 wherein in step d) the connection information associated with said users are only sent to the other ones of said users that have selected the same conference.

6. A method as recited in claim 3 wherein participation in each of said conferences requires a password.

7. A method as recited in claim 6 wherein a user is required to provide a valid password prior to selecting participation in a particular conference.

8. A method as recited in claim 7 wherein in said step d) the connection information associated with said users are only sent to the other ones of said users that have selected the same conference.

9. A method for establishing peer-to-peer network conferencing connections over the internet for two or more users, comprising the steps of:
   a) providing a web site communicatively connected to the internet;
   b) receiving at said web site the connection information associated with a first user using a first remote computer having a first internet-protocol (IP) address for establishing a conference over the internet, the connection information including said IP address of said first remote computer;
   c) receiving conference information for establishing a conference;
   d) storing the connection information associated with said first user and said conference information;
   e) receiving at said web site the connection information associated with one or more additional users each using an associated remote computer having an associated unique IP address, the connection information associated with each of said users including the IP address of said associated remote computer, and each of said users having specified participation in said conference;
   f) storing the connection information associated with said users; and
   g) passing the connection information associated with each of the users that have specified participation in said conference to each of the other users that have specified participation in said conference in order to facilitate establishing a direct network connection for conferencing among said users.

10. A method as recited in claim 9 wherein said direct network connection for a particular user is terminated by the steps of:
    sending by the remote computer of said particular user a request for termination of said direct network connection of said particular user;
    receiving said request; and
    deleting the connection information associated with said particular user from said web site.

11. A method as recited in claim 9 wherein participation in said conference requires a password.

12. A method as recited in claim 11 wherein a user is required to provide a valid password prior to selecting participation in said conference.

13. A method as recited in claim 12 wherein in said step g) the connection information associated with said users are only sent to the other ones of said users that have provided a valid password.

14. A method as recited in claim 9 wherein participation in said conference requires a password.

15. A method as recited in claim 14 wherein a user is required to provide a valid password prior to selecting participation in said conference.

16. A method as recited in claim 15 wherein in said step e) the connection information associated with said users are only sent to the other ones of said users that have provided a valid password.

17. A method for establishing peer-to-peer network connections over an interconnected network of computers for conferencing between two or more users, comprising the steps of:
    a) providing a web site at a host computer communicatively connected to said interconnected network of computer;
    b) receiving one or more sets of conference information for establishing one or more conferences;
    c) receiving at said web site connection information for one or more users each using an associated remote computer having an associated unique network address, each of said users specifying a particular conference;
    d) storing said connection information associated with said users;
    e) sending said connection information associated with each of said users specifying a same conference to the other ones of said users specifying said same conference in order to facilitate establishing direct network connections for conferencing.

* * * * *